United States Patent
Ish

(10) Patent No.: US 9,195,596 B2
(45) Date of Patent: Nov. 24, 2015

(54) MAPPING OF VALID AND DIRTY FLAGS IN A CACHING SYSTEM

(75) Inventor: Mark Ish, Atlanta, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 578 days.

(21) Appl. No.: 13/287,348

(22) Filed: Nov. 2, 2011

(65) Prior Publication Data

US 2013/0111145 A1  May 2, 2013

(51) Int. Cl.
*G06F 12/00* (2006.01)
*G06F 12/08* (2006.01)

(52) U.S. Cl.
CPC ............ *G06F 12/08* (2013.01); *G06F 12/0871* (2013.01); *G06F 12/0804* (2013.01); *G06F 2212/222* (2013.01)

(58) Field of Classification Search
CPC .................... G06F 12/0831; G06F 12/0804
USPC .......................................... 711/129, 144, 145
See application file for complete search history.

(56) References Cited

U.S. PATENT DOCUMENTS

| | | | |
|---|---|---|---|
| 5,778,430 A | 7/1998 | Ish et al. ................ | 711/133 |
| 5,895,485 A | 4/1999 | Loechel et al. ............ | 711/119 |
| 7,328,391 B2 * | 2/2008 | Hart et al. ................ | 714/753 |
| 7,856,531 B2 | 12/2010 | Bruening et al. .......... | 711/129 |
| 7,937,556 B2 | 5/2011 | Jordan et al. ............. | 711/206 |
| 7,953,931 B2 | 5/2011 | Yu et al. ................... | 711/117 |
| 7,958,334 B2 | 6/2011 | Rasche et al. ............. | 712/205 |
| 8,010,745 B1 | 8/2011 | Favor et al. ............... | 711/118 |
| 2003/0061452 A1 * | 3/2003 | Nakada ..................... | 711/144 |
| 2004/0225829 A1 * | 11/2004 | Akiyama et al. ........... | 711/104 |
| 2008/0189487 A1 * | 8/2008 | Craske ...................... | 711/125 |
| 2010/0257322 A1 * | 10/2010 | Isherwood et al. ......... | 711/141 |

\* cited by examiner

*Primary Examiner* — Gurtej Bansal

(57) ABSTRACT

An apparatus comprising a controller and a memory. The controller may be configured to generate (i) an index signal and (ii) an information signal in response to (i) one or more address signals and (ii) a data signal. The memory may be configured to store said information signal in one of a plurality of cache lines. Each of the plurality of cache lines has an associated one of a plurality of cache headers. Each of the plurality of cache headers includes (i) a first bit configured to indicate whether the associated cache line has all valid entries and (ii) a second bit configured to indicate whether the associated cache line has at least one dirty entry.

20 Claims, 4 Drawing Sheets

MAPPING OF VALID AND DIRTY FLAGS IN A CACHING SYSTEM

FIELD OF THE INVENTION

The present invention relates to memory circuits generally and, more particularly, to a method and/or apparatus for implementing mapping of valid and dirty flags in a caching system.

BACKGROUND OF THE INVENTION

Conventional cache systems track a valid and dirty status for each block (sector) within a cache line. For a 64 KB cache line, 32 bytes of valid and dirty flags are used. Since the amount of cache has grown dramatically since Solid State Devices (SSD) began to be used as caching memory, the amount of memory overhead associated with keeping track of each sector has grown linearly with the number of cache lines.

It would be desirable to reduce the amount of memory needed to keep track of the valid and dirty status and/or allow more memory to be used as actual data cache.

SUMMARY OF THE INVENTION

The present invention concerns an apparatus comprising a controller and a memory. The controller may be configured to generate (i) an index signal and (ii) an information signal in response to (i) one or more address signals and (ii) a data signal. The memory may be configured to store said information signal in one of a plurality of cache lines. Each of the plurality of cache lines has an associated one of a plurality of cache headers. Each of the plurality of cache headers includes (i) a first bit configured to indicate whether the associated cache line has all valid entries and (ii) a second bit configured to indicate whether the associated cache line has at least one dirty entry.

The objects, features and advantages of the present invention include providing a memory mapping system that may (i) provide valid and dirty flags on a per cache line basis, (ii) be used in a caching system and/or (iii) include (a) a first bit configured to indicate whether an associated cache line has all valid entries and (b) a second bit configured to indicate whether the associated cache line has at least one dirty entry.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
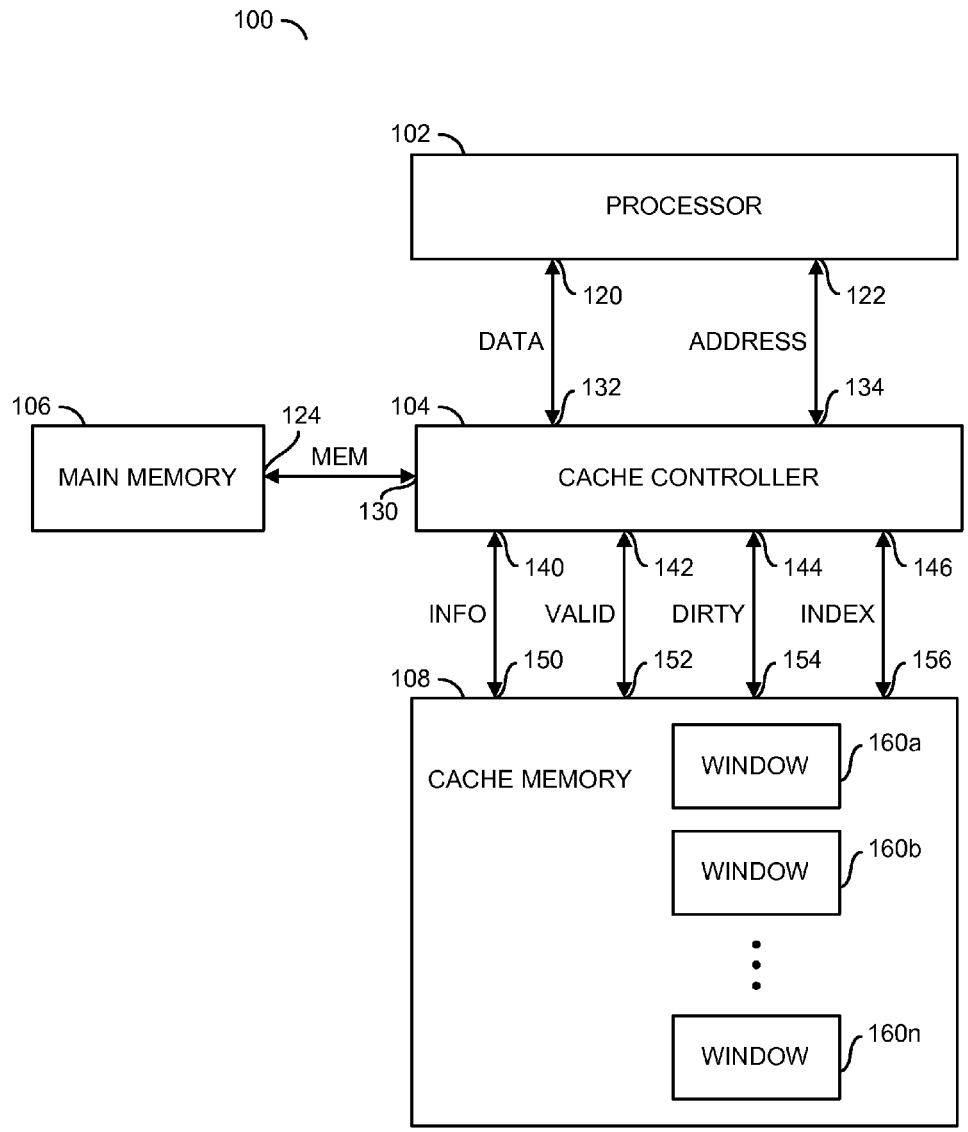
FIG. 1 is a block diagram of the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, and a block (or circuit) 108. The circuit 102 may be implemented as a processor. The circuit 104 may be implemented as a cache controller (or manager). The circuit 106 may be implemented as a main memory. The circuit 108 may be implemented as a cache memory. In one example, the circuit 108 may be implemented as a dynamic random access memory (DRAM). However, the particular type of memory used to implement the circuit 108 may be varied to meet the design criteria of a particular implementation. For example, the circuit 108 may be implemented as a solid state device.

The processor may have an input/output 120 that may present/receive a signal (e.g., DATA) and an input/output 122 that may present/receive a signal (e.g., ADDRESS). The circuit 106 may have an input/output 124 that may present/receive a signal (e.g., MEM). The circuit 104 may have an input/output 130 that may present/receive the signal MEM, an input/output 132 that may present/receive the signal DATA and an input/output 134 that may present/receive the signal ADDRESS. The circuit 104 may also have an input/output 140 that may present/receive a signal (e.g., INFO), an input/output 142 that may present/receive a signal (e.g., VALID), an input/output 144 that may present/receive a signal (e.g., DIRTY), and an input/output 146 that may present/receive a signal (e.g., INDEX). The signals VALID and DIRTY may be implemented as flags (e.g., or bit signals). The signals INFO and INDEX may be implemented as multi-bit signals. In one example, the cache memory 108 may be configured between the processor 102 and a safe storage (e.g., a hard disc drive (HDD), etc.).

The cache memory 108 may have an input/output 150 that may present/receive the signal INFO, an input/output 152 that may present/receive the signal VALID, an input/output 154 that may present/receive the signal DIRTY and an input/output 156 that may present/receive the signal INDEX. The cache memory 108 generally comprises a number of windows 160a-160n.

Figure 2:
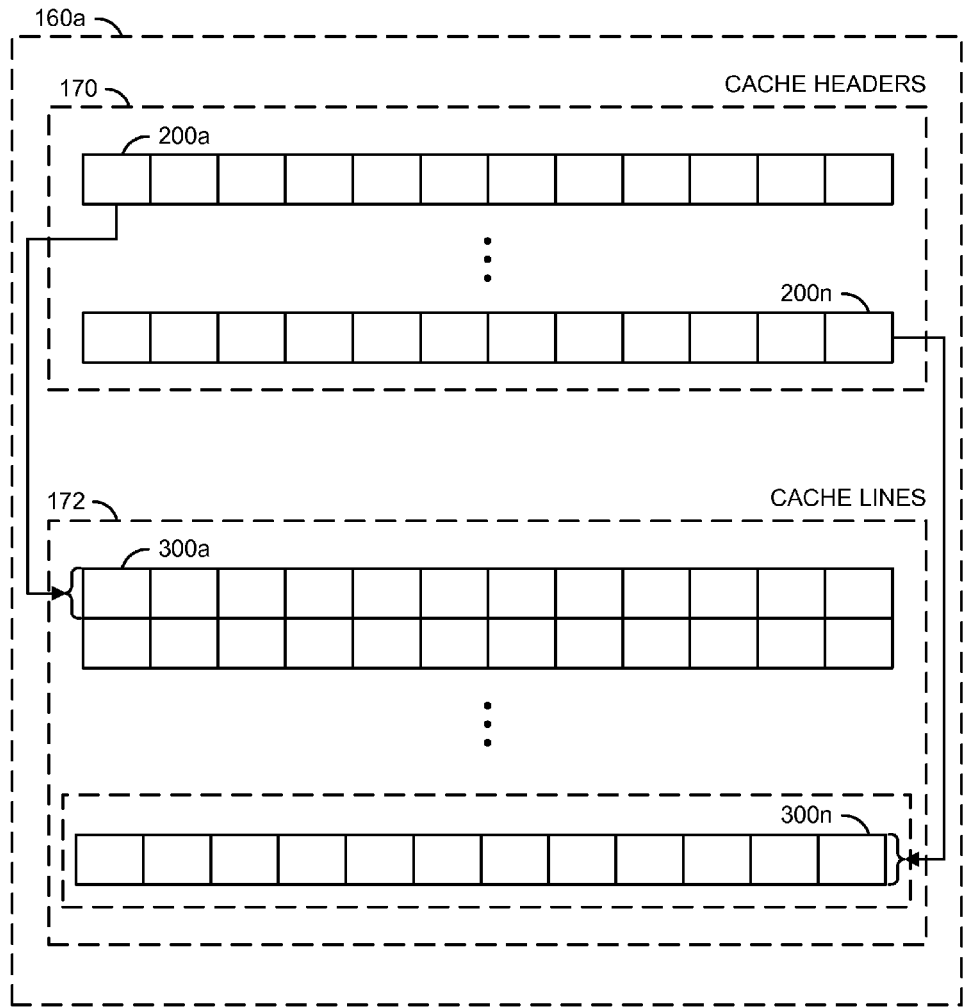
FIG. 2 is a diagram illustrating a window configuration of the memory of FIG. 1.

Referring to FIG. 2, a diagram of one of the windows 160a-160n of the memory 108 is shown. An example window 160a is shown. The window 160a may have a section 170 and a section 172. The section 170 may be implemented as a cache header section. The section 172 may be implemented as a cache line section. The cache header section 170 may be implemented as a number of individual cache headers 200a-200n. In one example, the cache headers may be implemented in a 16-bit wide configuration, with a number of rows following a 16-bit format. However, the particular number of bits implemented for each of the cache headers 200a-200n in each row may be varied to meet the design criteria of a particular implementation. For example, a range of between 16 and 1024 bits may be implemented.

In one example, the cache lines 300a-300n may be implemented in 16-bit wide configuration. The particular number of bits in the cache lines 300a-300n may be varied between, for example, 16 and 1024 bits. However, other number of bit formats for the cache headers 200a-200n and/or the cache lines 300a-300n may be implemented to meet the design criteria of a particular implementation.

The cache header 200a is shown mapped to the cache line 300a. Similarly, the cache header 200n is shown mapped to the cache line 300n. In one example, a one-to-one ratio between the cache headers 200a-200n and the cache lines 300a-300n may be implemented. In another example, the cache headers 200a-200n may be implemented in a hierarchal bit format. In such an example, a portion (e.g., ½, ¼, ⅛, etc.) of the cache memory 108 may be marked by the signal VALID. The signal VALID and the signal DIRTY may be stored as bits that may be placed next to the signal DATA. Saving meta data (e.g., where the signal VALID and the signal DIRTY status bits are typically stored) may become the equivalent of a cache line flush.

The signal DIRTY may be a bit (or a number of bits) that may signal that new data is present in cache memory 108 but not present in "safe" storage (e.g., a rotating media). The data in the cache memory 108 may be valid (e.g., not corrupted) but not "safe" until the data is flushed from the cache memory 108 to a secondary reliable storage (e.g., HDD, etc.). The bit DIRTY may indicate a) which data needs to be flushed and b) that a read request to a region with dirty data occurs. In such a case, the read should originate from the DRAM 108 and not "safe" storage. The bit VALID may represent the data that is valid in cache 108. For the most part, if the bit DIRTY is set for any given sector, the bit VALID will be set as well.

Figure 3:
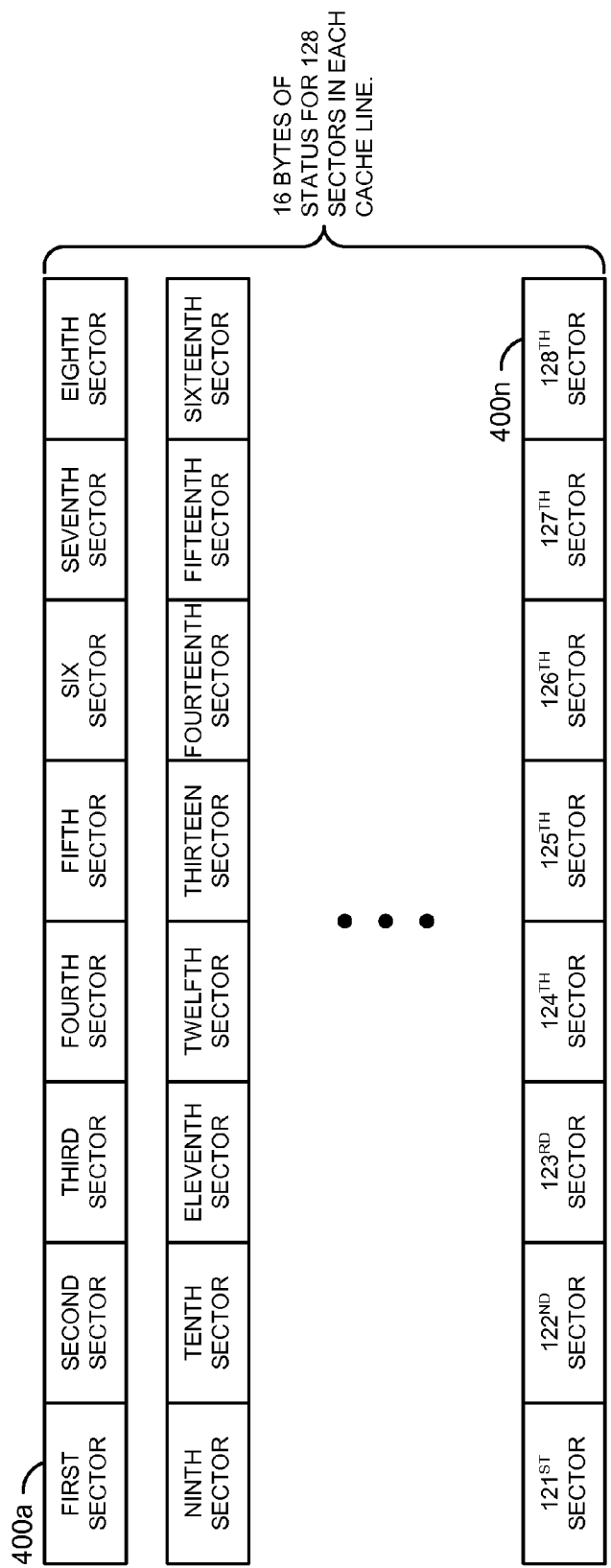
FIG. 3 is a diagram illustrating a sector configuration of the memory of FIG. 1.

Referring to FIG. 3, an example of a number of sectors are shown. A number of sector status bits 400a-400n are shown. In general, 16 bytes of status may be implemented for 128 sectors. The status bytes may be implemented for each of the cache lines 200a-200n. The status bytes may be repeated twice once for VALID and once for DIRTY.

Figure 4:
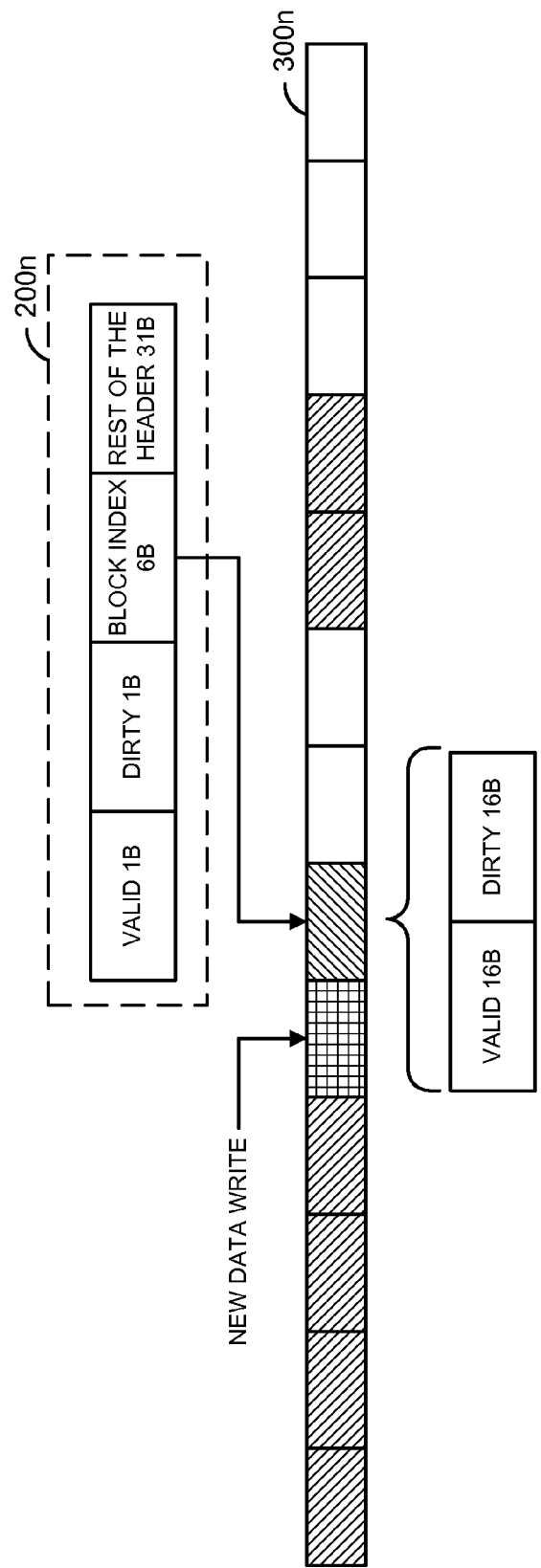
FIG. 4 is a diagram of a cache header of the memory of FIG. 1.

Referring to FIG. 4, an example of the relationship between one of the cache headers (e.g., 200n) and one of the cache lines (e.g., 300n) is shown. In general, each of the cache headers 200a-200n has an associated cache line 300a-300n. For each of the cache lines 300a-300n, a flag (or bit) VALID and a flag (or bit) DIRTY may be implemented to keep track of each block (or sector) in each of the cache lines 300a-300n. In one example, one of the cache lines 300a-300n may have a size of 64 KB. In such an example, 128 bits of the signal VALID and 128 bits of the signal DIRTY may be implemented. In one example, 32 bytes may be used to provide the flags (or bits) VALID and DIRTY for each of the cache lines 300a-300n. Without the system 100, as the size of the cache memory 108 increases (particularly if a Solid State device (SSD) is used to implement the cache memory 108), the amount of memory needed to implement the flags VALID and DIRTY tends to increase in a linear relationship.

The system 100 may avoid large memory usage for simple tracking purposes by implementing one flag (or bit) VALID and one flag (or bit) DIRTY to service an entire one of the cache lines 300a-300n. The status bit(s) INDEX may provide a block number within each of the cache lines 300a-300n. The status bit(s) INDEX may only need to be accessed if the particular one of the cache lines 300a-300n has the flag DIRTY as active. In such an example, if the flag VALID is 1, the entire one of the cache lines 300a-300n is valid and the signal INDEX does not need to be accessed. If the flag DIRTY is 1, at least some of the cache lines 300a-300n are dirty. If the valid flag bit is 0 and the dirty flag bit is 1, a portion of one of the cache lines 300a-300n may be dirty. If part of one of the cache lines 300a-300n is dirty, the signal INDEX may point to a block within one of the cache lines 300a-300n that contains detailed information on whether each of the sectors 400a-400n in each of the cache lines 300a-300n is valid and/or dirty. In one example, the signal INDEX may be implemented as an unsigned integer (e.g., an 8-bit unsigned integer). Such an approach may save memory and/or processing power if an entire one of the cache lines 300a-300n is valid. For example, if an entire one of the cache lines 300a-300n is valid, the signal INDEX does not normally need to be checked.

In the system 100, the signal VALID and/or the signal DIRTY may be reduced to a single bit for each one of cache lines 300a-300n. In one example, the signal INDEX may be implemented in the form of the block number that may be added to track the unused sector holding the rest of the VALID and/or DIRTY information. Such a configuration allows efficient use of memory, processing resources and/or the number of input/output requests used during a flush (de-stage) when meta data needs to be saved. The flags VALID and/or DIRTY may be stored as part of the data portion of each of the cache lines 300a-300n.

In one example, within each of the cache line headers 200a-200n, 1 bit may be used as a valid bit and 1 bit may be used as a dirty bit. In one example, 8 bits may be used to implement the signal INDEX. However, the particular bit width of the signal INDEX may be varied to meet the design criteria of a particular implementation. If the signal VALID is set to 1, the entire cache line (e.g., 300a) may have valid information. The signal DIRTY may indicate a dirty status on one or more of the sectors 400a-400n. In a dirty case, the entire cache line 300a is flushed. For example, when a cache line 300 is considered flushed, no data is read from the cache line 300a. In such an example, data that was previously stored in the cache line 300a would need to be retrieved from the permanent storage device (e.g., HDD, etc.) serviced by the memory 108. If the flag VALID is 0 and the flag DIRTY is 1, the cache line 300a may be partially dirty. In a partially dirty case, the signal INDEX may be pointing to the sector where the detailed information for a particular one of the cache lines 200a-200n is stored. In such an example, the entire 32 bytes of the flag VALID and/or the flag DIRTY may reside in a base address of one of the cache lines 300a-300n. An index number of sectors may also be stored. Since the signal VALID and/or DIRTY is normally read when the cache line 300a is in use, when the next write to the same cache line 300a occurs, the signal INDEX may be changed to the next unused sector. For optimization, the signal INDEX may be stored next to dirty data, either prepending or appending to the dirty data. When the data needs to be flushed, the index sector may be part of the flush without having to create a Scattered Gather List (SGL).

If the write completes for an entire one of the cache lines 300a-300n, the flag VALID may be set to 1 and the signal INDEX may be ignored since the particular one of the cache lines 300a-300n has been marked valid. In the absence of data for an entire one of the cache lines 300a-300n, there is generally at least one unused sector where details (e.g., 32 bytes) of valid and/or dirty information may be stored. In order to track each sector, 128 bits (e.g., 16 bytes) of information may be used for each variable tracked (e.g., VALID or DIRTY using 64 KB of Data, or 128 sectors).

In general, 16 cache lines may be grouped together to form a cache window (e.g., 160). In one example, each of the cache windows 160a-160n may have a size of 1 MB. However, the particular size of each of the cache windows 160a-160n may be varied to meet the design criteria of a particular implementation. The window 160 may carry a VALID and/or a DIRTY bit for each of the cache lines 300a-300n. To carry per sector valid and dirty information without the system 100, an additional 512 bytes of information area per window 160a-160n would be needed. The savings in overhead by the system 100 normally increases as the size of the cache memory 108 increases to have a very large number of windows 160a-160n.

The 32 bytes of sector level valid and/or dirty data may be stored in an unused portion of the 64 KB buffer. Additional helpful information may also be stored since the size of the sector is typically 512 Bytes and the system 100 only uses approximately 32 Bytes. Some of the 512 Bytes may be taken up by other parameters (e.g., a magic number of 4 Bytes, and/or checksum of 4 Bytes, etc.). 16 bytes of sector locator information may be included (e.g., 7 bits for 128 sectors). 16 bytes may cover 16 buffers. Each locator may hold the sector number within 64 KB buffer of meta data. Window level valid and/or dirty bits may be set as follows: valid 0 and dirty 1 if buffer has partial valid and/or dirty data. The sector locator may track which sectors within the buffer are valid and/or which sectors are dirty. A valid 1 may indicate that the entire 64 KB buffer is valid, with no need for sector locator. If the dirty bit is 0, there is generally not any dirty data in the buffer. Otherwise, there may be some dirty data in the buffer.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a controller configured to generate (i) an index signal and (ii) an information signal in response to (i) one or more address signals and (ii) a data signal; and
    a memory configured to store said information signal in one of a plurality of cache lines comprising a plurality of sectors, wherein each of said plurality of cache lines has an associated one of a plurality of cache headers, wherein each of said plurality of cache headers includes (i) a first bit configured to indicate whether said associated cache line has all valid entries, (ii) a second bit configured to indicate whether said associated cache line has at least one dirty entry, and (iii) said index signal configured to point to a changeable location of a status block in said associated cache line containing status information for said associated cache line, wherein said status block stores status information about whether each sector of said plurality of sectors is current or not current, and said status information is stored only when said second bit is set to indicate at least one dirty entry in said associated cache line.

2. The apparatus according to claim 1, wherein said first bit comprises a valid flag.

3. The apparatus according to claim 1, wherein said second bit comprises a dirty flag.

4. The apparatus according to claim 1, wherein said memory comprises a cache memory, and wherein each window level of said plurality of window levels comprises 16 cache lines.

5. The apparatus according to claim 1, wherein said valid entries comprises up to date cache entries and said dirty entries comprise out of date cache entries.

6. The apparatus according to claim 1, wherein said cache headers are stored within said cache lines.

7. The apparatus according to claim 1, wherein said memory comprises a solid state device.

8. The apparatus according to claim 1, wherein said status block is an otherwise unused block in a data portion of said associated cache line.

9. The apparatus according to claim 1, wherein said status information for said associated cache line is stored next to data determined to be dirty in said associated cache line.

10. The apparatus according to claim 1, wherein a flush of said status information for said associated cache line is part of a flush of data without creating a Scattered Gather List.

11. The apparatus according to claim 1, wherein said status information is further configured to store a magic number and a checksum.

12. The apparatus according to claim 1, wherein said index signal stored in said cache header is not checked if said associated cache line has all valid entries.

13. The apparatus according to claim 1, wherein said changeable location of said status block is changed to a next otherwise unused data block when a write is performed on said associated cache line.

14. The apparatus according to claim 1, wherein the memory is further configured to store said information signal in one of a plurality of window levels, and wherein each window level of said plurality of window levels includes (i) at least a third bit to indicate at a window level whether said one of a plurality of window levels has dirty data and (ii) said index signal further configured to point to a location within said one of a plurality of window levels.

15. The apparatus according to claim 1, wherein each of said plurality of cache headers are checked prior to reading data from said memory.

16. The apparatus according to claim 15, wherein said plurality of cache headers determine whether (i) said information in said memory is ready to be read or (ii) said information in said memory needs to be flushed.

17. A method for controlling a cache memory, comprising the steps of:
    generating (i) an index signal and (ii) an information signal in response to (i) one or more address signals and (ii) a data signal;
    storing said information signal in one of a plurality of cache lines, wherein each of said plurality of cache lines has an associated one of a plurality of cache headers, wherein each of said plurality of cache headers includes (i) a first bit configured to indicate whether said associated cache line has all valid entries, (ii) a second bit configured to indicate whether said associated cache line has at least one dirty entry and (iii) said index signal configured to point to a changeable location of a status block in said associated cache line containing status information for said associated cache line; and
    storing said information signal in one of a plurality of window levels, wherein each window level of said plurality of window levels includes (i) at least a third bit to indicate at a window level whether said one of a plurality of window levels has dirty data and (ii) said index signal further configured to point to a location within said one of a plurality of window levels.

18. The method according to claim 17, wherein each of said plurality cache headers are checked prior to reading data from said memory.

19. The method according to claim 17, wherein said plurality of cache headers determine whether (i) said information in said memory is ready to be read or (ii) said information in said memory needs to be flushed.

20. The method according to claim 17, wherein (i) each of said plurality of cache lines comprises a plurality of sectors, (ii) said status block stores status information about whether each sector is current or not current, and (ii) said sector information is only accessed if said second bit is set to indicate at least one dirty entry in said associated cache line.

* * * * *